United States Patent
Singh et al.

(10) Patent No.: US 10,424,029 B2
(45) Date of Patent: Sep. 24, 2019

(54) METHOD AND SYSTEM FOR PROVIDING A HOUSING RECOMMENDATION

(71) Applicant: MasterCard International Incorporated, Purchase, NY (US)

(72) Inventors: Amit Singh, Uttar Pradesh (IN); Avyaktanand Tiwary, Haryana (IN); Mayank Prakash, Uttarakhand (IN); Sheetanshu D. Gupta, Gurgaon Haryana (IN); Sharan Bakshiram, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 469 days.

(21) Appl. No.: 15/280,152

(22) Filed: Sep. 29, 2016

(65) Prior Publication Data

US 2017/0103484 A1 Apr. 13, 2017

(30) Foreign Application Priority Data

Oct. 9, 2015 (SG) .......................... 10201508376R

(51) Int. Cl.
*G06Q 30/06* (2012.01)
*G06Q 50/16* (2012.01)
*G06F 7/02* (2006.01)

(52) U.S. Cl.
CPC .............. *G06Q 50/16* (2013.01); *G06F 7/026* (2013.01); *G06Q 30/0631* (2013.01)

(58) Field of Classification Search
None
See application file for complete search history.

(56) References Cited

U.S. PATENT DOCUMENTS

| 8,010,403 B2 * | 8/2011 | Kala | G06Q 30/02 |
| | | | 705/7.33 |
| 8,732,219 B1 * | 5/2014 | Ferries | G06Q 50/01 |
| | | | 707/825 |

(Continued)

OTHER PUBLICATIONS

Chick, G., and Handfield, R.B., "The Procurement Value Proposition: The Rise of Supply Management," Chapter 8, pp. 173-195, Kogan Page Limited; London, Philadelphia, 2015 (Year: 2015).*

(Continued)

*Primary Examiner* — Nicholas D Rosen
(74) *Attorney, Agent, or Firm* — Buchanan Ingersoll & Rooney PC

(57) ABSTRACT

Method and system for providing a housing recommendation to a user. The method comprising: determining, using a recommendation module, a spending behavior of the user based on transaction data relating to electronic payment transactions involving the user; dividing, using the recommendation module communicatively coupled with a geographic information system (GIS), a geographical area into a plurality of localities based on geographic information from the GIS; determining, using the recommendation module, an average spending behavior of residents in each locality based on transaction data relating to electronic payment transactions involving the residents; assigning, using the recommendation module, a base score to each locality based on a presence of residents in the locality with similar spending behavior to the user; and transmitting, to a user output module communicatively coupled with the recommendation module, the housing recommendation that is based on the base score of each locality.

21 Claims, 3 Drawing Sheets

(56) References Cited

U.S. PATENT DOCUMENTS

| | | | |
|---|---|---|---|
| 9,646,025 B2 * | 5/2017 | Boyns | H04W 4/21 |
| 10,096,043 B2 * | 10/2018 | Beck | G06Q 30/0267 |
| 2008/0162258 A1 * | 7/2008 | Kala | G06Q 30/02 |
| | | | 705/7.33 |
| 2010/0070381 A1 * | 3/2010 | Shea | G06F 21/10 |
| | | | 705/26.1 |
| 2010/0076968 A1 * | 3/2010 | Boyns | H04W 4/21 |
| | | | 707/732 |
| 2010/0100424 A1 * | 4/2010 | Buchanan | G06Q 20/10 |
| | | | 705/35 |
| 2013/0073340 A1 | 3/2013 | Alex et al. | |
| 2013/0191213 A1 * | 7/2013 | Beck | G06O 30/0267 |
| | | | 705/14.53 |
| 2015/0248707 A1 | 9/2015 | Mi et al. | |
| 2015/0278915 A1 | 10/2015 | Dedhia et al. | |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 27, 2016, in the corresponding International Application No. PCT/US2016/053304. (9 pages).

\* cited by examiner

METHOD AND SYSTEM FOR PROVIDING A HOUSING RECOMMENDATION

TECHNICAL FIELD

The present disclosure relates broadly, but not exclusively, to methods and systems for providing a housing recommendation.

BACKGROUND

When a tenant/buyer wishes to rent/purchase a property, an important consideration (and in many cases, the most important consideration) is the location of the property. In particular, a location's accessibility, amenities, infrastructure, crime rate, etc. are important factors to consider.

Currently, when a tenant/buyer wishes to rent/purchase a property, he may engage a real-estate agent to assist in finding properties in a suitable location. The tenant/buyer may inform the real-estate agent of his preferences so that the real-estate agent can short-list some suitable properties that may appeal to him. However, real-estate agents typically charge a substantial fee for their services.

Alternatively, the tenant/buyer can visit real-estate web portals or look at property listings in the classified advertisement portion of newspapers to identify suitable properties. However, the tenant/buyer needs to do additional research on the location of each property, such as the location's accessibility, amenities, infrastructure, crime rate, etc. Moreover, some real-estate web portals are overloaded with information, and this information may not always be relevant in terms of the location's accessibility, amenities, infrastructure, crime rate, etc.

If the tenant/buyer is relocating to a new country or city, finding a property with a good location may be even more difficult as he may not be familiar with the country or city.

Also, besides a location's accessibility, amenities, infrastructure and crime rate, the tenant/buyer may also be keen to know if the residents of a certain location have similar demographics (age, education level, income level, etc.) to him. Currently, such information is not easily obtainable.

A need therefore exists to provide methods and systems for providing a housing recommendation that seek to address at least the above-mentioned problems.

SUMMARY

According to a first aspect, there is provided a method for providing a housing recommendation to a user, comprising: determining, using a recommendation module, a spending behavior of the user based on transaction data relating to electronic payment transactions involving the user; dividing, using the recommendation module communicatively coupled with a geographic information system (GIS), a geographical area into a plurality of localities based on geographic information from the GIS; determining, using the recommendation module, an average spending behavior of residents in each locality based on transaction data relating to electronic payment transactions involving the residents; assigning, using the recommendation module, a base score to each locality based on a presence of residents in the locality with similar spending behavior to the user; and transmitting, to a user output module communicatively coupled with the recommendation module, the housing recommendation that is based on the base score of each locality.

The spending behavior of the user may comprise historical expenditure in each of a plurality of industry-types, and the method may further comprise: identifying, using the recommendation module, merchants of each industry-type in each locality based on merchant data relating to merchants within the geographical area; and assigning, using the recommendation module, a merchant score to each locality based on a presence of merchants of each industry-type for which there is historical expenditure, wherein the housing recommendation is based on the base and merchant score of each locality.

The step of identifying merchants of each industry-type in each locality may comprise: retrieving a physical location and merchant category code (MCC) of each merchant based on the merchant data; and determining, for each locality, a quantity of merchants of each industry-type based on the retrieved physical location and MCC of each merchant.

The historical expenditure may comprise an average ticket size and/or a frequency of the electronic payment transactions involving the user.

The method may further comprise: receiving, from a user input module communicatively coupled with the recommendation module, user demographic data indicative of an income of the user; determining, using the recommendation module, an average income of residents in each locality based on census data relating to the residents; and assigning, using the recommendation module, an income score to each locality based on a presence of residents in the locality with similar income to the user, wherein the housing recommendation is based on the base and income score of each locality.

The user demographic data may be further indicative of an age of the user, and the method may further comprise: determining, using the recommendation module, an average age of residents in each locality based on the census data relating to the residents; and assigning, using the recommendation module, an age score to each locality based on a presence of residents in the locality with similar age to the user, wherein the housing recommendation is based on the base, income and age score of each locality.

The user demographic data may be further indicative of an education level of the user, and the method may further comprise: determining, using the recommendation module, an average education level of residents in each locality based on the census data relating to the residents; and assigning, using the recommendation module, an education score to each locality based on a presence of residents in the locality with similar education level to the user, wherein the housing recommendation is based on the base, income, age and education score of each locality.

The method may further comprise: determining, using the recommendation module, a security level of each locality based on crime data of the geographical area and electronic payment transaction fraud data relating to electronic payment transactions involving merchants located within the geographical area; and assigning, using the recommendation module, a security score to each locality based on the security level, wherein the housing recommendation is based on the base and security score of each locality.

The method may further comprise: determining, using the recommendation module, an infrastructure quality level of each locality based on infrastructure data of the geographical area, the infrastructure data indicative of a quality of amenities in the locality; and assigning, using the recommendation module, an infrastructure score to each locality based on the infrastructure quality level, wherein the housing recommendation is based on the base and infrastructure score of each locality.

The method may further comprise: determining, using the recommendation module, a transport quality level of each locality based on transport data of the geographical area, the transport data indicative of reliability, frequency, safety and accessibility of public transport in the locality; and assigning, using the recommendation module, a transport score to each locality based on the transport quality level, wherein the housing recommendation is based on the base and transport score of each locality.

Each score may be associated with a housing recommendation component, and the method may further comprise: receiving weightage data indicative of a priority of each housing recommendation component; applying the weightage data to each score to generate a weighted score for each housing recommendation component in each locality; calculating a sum of all the weighted scores for each locality; and ranking the plurality of localities based on the sum of all the weighted scores for each locality, wherein the housing recommendation is based on the ranking.

According to a second aspect, there is provided a system for providing a housing recommendation to a user, comprising a recommendation module comprising: at least one processor; and at least one memory including computer program code; the at least one memory and the computer program code configured to, with at least one processor, cause the recommendation module at least to: determine a spending behavior of the user based on transaction data relating to electronic payment transactions involving the user; divide a geographical area into a plurality of localities based on geographic information from a geographic information system (GIS) that is communicatively coupled with the recommendation module; determine an average spending behavior of residents in each locality based on transaction data relating to electronic payment transactions involving the residents; assign a base score to each locality based on a presence of residents in the locality with similar spending behavior to the user; and transmit the housing recommendation that is based on the base score of each locality to a user output module communicatively coupled with the recommendation module.

The spending behavior of the user may comprise historical expenditure in each of a plurality of industry-types, and the recommendation module may be further caused to: identify merchants of each industry-type in each locality based on merchant data relating to merchants within the geographical area; and assign a merchant score to each locality based on a presence of merchants of each industry-type for which there is historical expenditure, wherein the housing recommendation is based on the base and merchant score of each locality.

The recommendation module may be further caused to: receive user demographic data indicative of an income of the user from a user input module communicatively coupled with the recommendation module; determine an average income of residents in each locality based on census data relating to the residents; and assign an income score to each locality based on a presence of residents in the locality with similar income to the user, wherein the housing recommendation is based on the base and income score of each locality.

The user demographic data may be further indicative of an age of the user, and the recommendation module may be further caused to: determine an average age of residents in each locality based on the census data relating to the residents; and assign an age score to each locality based on a presence of residents in the locality with similar age to the user, wherein the housing recommendation is based on the base, income and age score of each locality.

The user demographic data may be further indicative of an education level of the user, and the recommendation module may be further caused to: determine an average education level of residents in each locality based on the census data relating to the residents; and assign an education score to each locality based on a presence of residents in the locality with similar education level to the user, wherein the housing recommendation is based on the base, income, age and education score of each locality.

The recommendation module may be further caused to: determine a security level of each locality based on crime data of the geographical area and electronic payment transaction fraud data relating to electronic payment transactions involving merchants located within the geographical area; and assign a security score to each locality based on the security level, wherein the housing recommendation is based on the base and security score of each locality.

The recommendation module may be further caused to: determine an infrastructure quality level of each locality based on infrastructure data of the geographical area, the infrastructure data indicative of a quality of amenities in the locality; and assign an infrastructure score to each locality based on the infrastructure quality level, wherein the housing recommendation is based on the base and infrastructure score of each locality.

The recommendation module may be further caused to: determine a transport quality level of each locality based on transport data of the geographical area, the transport data indicative of reliability, frequency, safety and accessibility of public transport in the locality; and assign a transport score to each locality based on the transport quality level, wherein the housing recommendation is based on the base and transport score of each locality.

Each score may be associated with a housing recommendation component, and the recommendation module may be further caused to: receive weightage data indicative of a priority of each housing recommendation component; apply the weightage data to each score to generate a weighted score for each housing recommendation component in each locality; calculate a sum of all the weighted scores for each locality; and rank the plurality of localities based on the sum of all the weighted scores for each locality, wherein the housing recommendation is based on the ranking.

According to a third aspect, there is provided a non-transitory computer readable medium having stored thereon executable instructions for controlling a recommendation module to perform steps comprising: determining a spending behavior of the user based on transaction data relating to electronic payment transactions involving the user; dividing a geographical area into a plurality of localities based on geographic information from a geographic information system (GIS) that is communicatively coupled with the recommendation module; determining an average spending behavior of residents in each locality based on transaction data relating to electronic payment transactions involving the residents; assigning a base score to each locality based on a presence of residents in the locality with similar spending behavior to the user; and transmitting the housing recommendation that is based on the base score of each locality to a user output module communicatively coupled with the recommendation module.

BRIEF DESCRIPTION OF THE DRAWINGS

Embodiments will be better understood and readily apparent to one of ordinary skill in the art from the following written description, by way of example only, and in conjunction with the drawings, in which.

DETAILED DESCRIPTION

Figure 1:
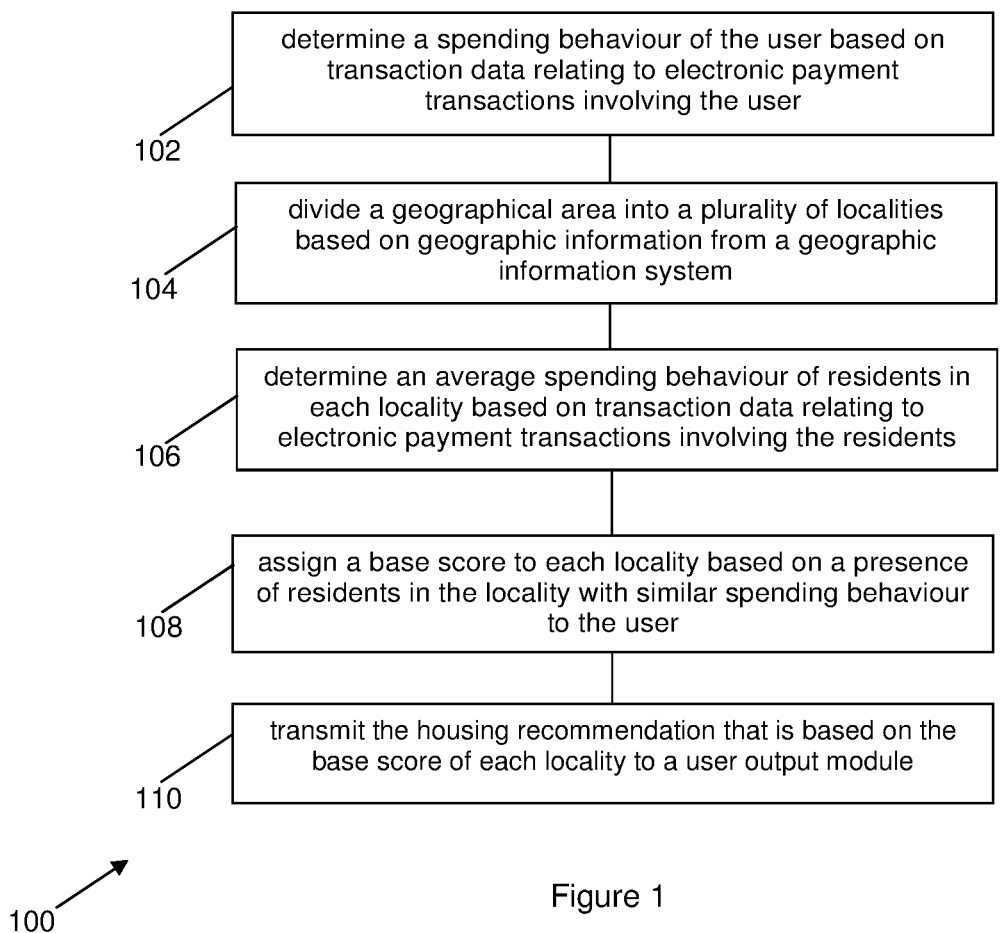
FIG. 1 shows a flow chart illustrating a method for providing a housing recommendation according to an example embodiment.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Currently, many merchants accept electronic payment transactions as an alternative to cash for the payment for products. In such electronic payment transactions, a payment card may be used. As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transaction card can be used as a method of payment for performing a transaction. Payment cards are typically uniquely tied to a consumer or card holder account. Typically, in a "card-present" electronic payment transaction, when a payment card holder (consumer) wishes to purchase a product from a merchant, the payment card holder presents his/her payment card to the merchant. The merchant typically has a point-of-sale (POS) terminal with a card reader that can interact/communicate with the payment card and facilitates the conduct of the electronic payment transaction.

The merchant typically submits a request to an acquirer (a financial institution that processes and settles the merchant's transactions with the help of an issuer). The acquirer then sends the request to the issuer (a financial institution, bank, credit union or company that issues or helps issue cards to payment card holders) to authorize the transaction. A financial institution/payment facilitator (e.g. MasterCard®) acts as an intermediary between the acquirer and the issuer. If the acquirer authorizes the transaction (e.g. there are sufficient funds/credit in the payment card holder's account), the merchant releases the product to the payment card holder.

During a typical electronic payment transaction, certain data related to or associated with the transaction (i.e. electronic payment transaction data) may be generated and the transaction data may be captured/collected by the payment facilitator. For example, the transaction data may be uploaded to a data warehouse on a regular basis (e.g. daily, weekly, monthly). If necessary, various algorithms/rules can be applied to anonymize the transaction data so that no personally identifiable numbers are available to the users of the transaction data.

The following types of transaction data can be may be generated/captured:

Transaction level information:—
Transaction ID
Account ID (anonymized)
Merchant ID
Transaction Amount
Transaction Local Currency Amount
Date of Transaction
Time of Transaction
Type of Transaction Date of Processing
Cardholder Present Code
Merchant Category Code (MCC)
Account Information:—
Account ID (anonymized)
Card Group Code
Card Product Code
Card Product Description
Card Issuer Country
Card Issuer ID
Card Issuer Name
Aggregate Card Issuer ID
Aggregate Card Issuer Name
Merchant Information:—
Merchant ID
Merchant Name
MCC/Industry Code
Industry Description
Merchant Country
Merchant Address
Merchant Postal Code
Aggregate Merchant ID
Aggregate Merchant Name
Merchant Acquirer Country
Merchant Acquirer ID
Issuer Information:—
Issuer ID
Issuer Name
Aggregate Issuer ID
Issuer Country The electronic payment transaction data can be used in conjunction with other types of data to provide a housing recommendation to a user. In an exemplary implementation, a score is assigned to each of a plurality of localities within a geographical area based on certain factors such as the locality's accessibility, amenities, infrastructure, crime rate, spending behavior of residents, etc. The score provides an indication to the user which localities within the geographical area are expected to appeal to him so that he can look at properties to rent/purchase within the recommended localities.

FIG. 1 shows a flow chart illustrating a method 100 for providing a housing recommendation to a user, according to an exemplary embodiment. The method 100 may be performed by a purpose-built computing device such as a recommendation module that is coupled to one or more databases and/or systems (e.g. a geographic information system). Further details on the recommendation module and databases will be provided below with reference to FIGS. 2 and 3.

The method 100 includes a step 102 of using the recommendation module to determine a spending behavior of the user. The spending behavior (also referred to as "spending pattern" or "spending profile") of the user can be determined based on transaction data relating to electronic payment transactions involving the user (i.e. electronic payment transactions conducted in relation to the purchase of products by the user). Details on the electronic payment transaction data have been provided above.

Before determining the spending behavior of the user, the identity of the user may be determined by receiving (e.g. via a user input module) user identification data such as a unique identifier, an account number of the user, or cardholder identification data. Once the identity of the user is known, transaction data relating to electronic payment transactions involving the user can be retrieved from a database.

In an exemplary implementation, the spending behavior of the user may include the user's historical expenditure in each industry-type (e.g. food & beverage, transport, groceries, consumer electronics, etc.), across a plurality of industry-types. The historical expenditure in each industry-type may be defined based on an average ticket size of the electronic payment transactions involving the user. Additionally or alternatively, the historical expenditure may be defined based on a frequency of the electronic payment transactions involving the user. For example, the historical expenditure of the user may be defined as "A monthly expenditure of $500 on groceries". The user's historical expenditure in each industry-type, across a plurality of industry-types, may provide a representative spending behavior (spending pattern/spending profile) of the user.

Step 104 involves using the recommendation module, that is communicatively coupled with a geographic information system (GIS), to divide a geographical area (e.g. a city, state, town, etc.) into a plurality of localities (e.g. sectors, districts, blocks, etc.) based on geographic information from the GIS. The GIS is configured to capture, store, manipulate, analyze, manage, and/or present all types of spatial or geographical information (e.g. map data, latitudes-longitudes of places). For example, the geographical area can be divided into a plurality of localities based on postal codes or based on pre-defined sectors or districts of a city.

Step 106 involves using the recommendation module to determine an average spending behavior (spending pattern/spending profile) of residents in each locality based on transaction data relating to electronic payment transactions involving the residents. The average spending behavior of the residents may include average (median or mean) historical expenditure in each industry-type, across a plurality of industry-types. Preferably, the plurality of industry-types are the same for the residents in each locality as those for the user (refer to step 102). The average historical expenditure in each industry-type may be defined based on an average ticket size of the electronic payment transactions involving all (or more typically, a representative sample size of) residents living in the locality. Additionally or alternatively, the historical expenditure may be defined based on an average frequency of the electronic payment transactions involving all (or a representative sample size of) the residents living in the locality. For example, the average historical expenditure of the residents in a particular locality may be defined as "A monthly expenditure of $300 on groceries".

Step 108 involves using the recommendation module to generate and assign a base score to each locality based on a presence of residents in the locality with similar spending behavior to the user.

In an implementation, similarity in spending behavior between the user and residents in a locality can be based on the difference in expenditure across at least one industry-type. Continuing from the example above, if the historical expenditure of the user is "A monthly expenditure of $500 on groceries" and the average historical expenditure of the residents in locality ABC is "A monthly expenditure of $300 on groceries" while the average historical expenditure of the residents in locality XYZ is "A monthly expenditure of $450 on groceries", it can be said that the spending behavior of residents in locality XYZ has a greater similarity to the user than the spending behavior of residents in locality ABC. In other words, it can be said that there is a greater presence of residents in locality XYZ with similar spending behavior to the user compared to locality ABC. Therefore, in this context, "presence" is a quantitative measurement. Locality XYZ can be assigned a higher base score compared to locality ABC, a higher score indicating a greater presence of residents with similar spending behavior to the user. The base score may be determined based on the differences in expenditure between the user and residents across industry-types. Preferably, similarity in spending behavior is based on expenditure in more than one industry-type (e.g. groceries, travel, transport, etc.) so that a more complete comparison of users' and residents' spending behavior can be obtained.

Step 110 involves transmitting, to a user output module that is communicatively coupled with the recommendation module, the housing recommendation that is based on the base score of each locality. A higher score may indicate that a locality is more suitable for the user (i.e. a better recommendation). A number of localities (e.g. five) with the highest scores can be identified and recommended to the user. Therefore, the recommendation may be which localities within the geographical area are expected to appeal to him. The user can then look at properties to rent/purchase that are located within the recommended localities.

The steps of method 100 need not be performed in the specific order shown in FIG. 1. For example, step 104 may be performed before step 102.

The base score is associated with similarity in spending behaviour between residents and users, and in particular, a presence of residents in each locality with similar spending behavior to the user. Similarity in spending behavior can be considered as a component of the housing recommendation. Besides similarity in spending behaviour, other components can be taken into account when providing the housing recommendation. Other components include, but are not limited to: (i) similarity between residents and the user in terms of demographics (e.g. income, age, education level), (ii) crime rate in a locality, (iii) infrastructure of a locality, (iv) accessibility of a locality, and (v) availability/presence of merchants in a locality that satisfy the user's consumption needs (i.e. merchants which the user is expected to patronize). Taking into account more than one component advantageously provides a more holistic housing recommendation.

As mentioned above, the spending behavior of the user may include the user's historical expenditure in each industry-type, across a plurality of industry-types. By determining the user's historical expenditure in each industry-type, across a plurality of industry-types, it is possible to provide a housing recommendation that is also based on a presence of merchants that satisfy the user's consumption needs (i.e. merchants which the user is expected to patronize). Accordingly, in an implementation, the method for providing the housing recommendation to the user may further include the steps of: (i) using the recommendation module to identify merchants of each industry-type in each locality based on merchant data relating to merchants within the geographical area; and (ii) using the recommendation module to assign a merchant score to each locality based on a presence of merchants of each industry-type for which there is historical expenditure by the user. In this case, the housing recommendation is based on the base and merchant score of each locality.

The merchant data may comprise a physical location (e.g. address, postal code, longitude/latitude) and merchant category code (MCC) of each merchant. Based on the physical location, it is possible to determine which locality each merchant is located in. Based on the MCC, it is possible to determine which industry-type each merchant belongs to. Accordingly, the step of identifying merchants of each industry-type in each locality may involve the following sub-steps: (a) retrieving a physical location (e.g. address, postal code, longitude/latitude) and merchant category code (MCC) of each merchant based on the merchant data; and (b) determining, for each locality, a quantity (number) of merchants of each industry-type based on the retrieved physical location and MCC of each merchant.

Assuming that based on historical transaction data relating to electronic payment transactions involving a user, it is found that the user historically has high expenditure in the airline industry. As such, the housing recommendation can take into account the quantity (number) of airline merchants in each locality. For example, assume that there are "10 merchants in the airline industry in locality ABC" and "6 merchants in the airline industry in locality XYZ". Continuing from the example above, it can be said that there is a greater presence of airline merchants in locality ABC compared to locality XYZ. In this context, "presence" is a quantitative measurement, i.e. quantity (number) of airline merchants in each locality. As such, locality ABC can be assigned a higher merchant score compared to locality XYZ, a higher score indicating a greater presence of merchants for which there is historical expenditure by the user.

In another implementation, the distance of each merchant to each locality can be determined based on the physical location of the merchant. Once the distance of each merchant to each locality is determined, an average (mean or median) distance of all (or more typically, a representative sample size of) merchants belonging to a particular industry-type to each locality can be determined. For example, an average (mean or median) distance of merchants belonging to the airline industry to locality ABC is 10 km and to locality XYZ is 15 km. Since each locality is typically defined by an area rather than a point, the distance of a merchant to each locality may be the straight-line distance from a merchant to a geographic centre of a locality.

Assuming again that based on historical transaction data relating to electronic payment transactions involving the user, it is found that the user historically has high expenditure in the airline industry. As such, the housing recommendation can take into account the presence of airline merchants in each locality. Continuing from the example above where the average (mean or median) distance of merchants belonging to the airline industry to locality ABC is 10 km and to locality XYZ is 15 km, it can be said that there is a greater presence of airline merchants in locality ABC compared to locality XYZ. In this context, "presence" is a quantitative measurement, i.e. average (mean or median) distance of merchants to each locality. As such, locality ABC can be assigned a higher merchant score compared to locality XYZ, a higher score indicating a greater presence of merchants for which there is historical expenditure by the user.

In any case, it is preferable that the merchant score for each locality is based on a presence of merchants of each industry-type, across a plurality of industry-types. At step 102, the spending behavior of the user is determined, and the spending behavior includes the user's historical expenditure in each industry-type, across a plurality of industry-types. Accordingly, it is preferable that the plurality of industry-types that are used to generate the merchant score are the same as those that the user has historical expenditure in.

The housing recommendation can also be based on other components, such as demographics (e.g. income, age, education level). In an implementation, the method for providing the housing recommendation to the user may further include the steps of: (i) receiving, from a user input module that is communicatively coupled with the recommendation module, user demographic data indicative of an income of the user; (ii) using the recommendation module to determine an average (mean or median) income of residents in each locality based on census data relating to the residents; and (iii) using the recommendation module to assign an income score to each locality based on a presence of residents in the locality with similar income to the user. In this case, the housing recommendation is based on the base and income score of each locality. For example, if the monthly income of the user is "$5000" and the average monthly income of the residents in locality ABC is "$2000" while the average monthly income of the residents in locality XYZ is "$5100", it can be said that the average monthly income of the residents in locality XYZ has a greater similarity to the user than the average monthly income of residents in locality ABC. In other words, it can be said that there is a greater presence of residents in locality XYZ with similar income to the user compared to locality ABC. Therefore, in this context, "presence" is a quantitative measurement, i.e. absolute difference in income. Locality XYZ can be assigned a higher income score compared to locality ABC, a higher score indicating a greater presence of residents with similar income to the user.

The user demographic data may also be indicative of an age of the user which may also be received via the user input module. In such a case, the method for providing the housing recommendation to the user may further include the steps of: (i) using the recommendation module to determine an average (mean or median) age of residents in each locality based on the census data relating to the residents; and (ii) using the recommendation module to assign an age score to each locality based on a presence of residents in the locality with similar age to the user. In such a case, the housing recommendation may be based on the base, income and/or age score of each locality. For example, if the age of the user is "30 years old" and the average age of the residents in locality ABC is "40 years old" while the average age of the residents in locality XYZ is "32 years old", it can be said that the average age of the residents in locality XYZ has a greater similarity to the user than the average age of residents in locality ABC. In other words, it can be said that there is a greater presence of residents in locality XYZ with similar age to the user compared to locality ABC. Therefore, in this context, "presence" is a quantitative measurement, i.e. absolute difference in age. Locality XYZ can be assigned a higher age score compared to locality ABC, a higher score indicating a greater presence of residents with similar age to the user.

The user demographic data may also be indicative of an education level of the user which may also be received via the user input module. In such a case, the method for providing the housing recommendation to the user may further include the steps of: (i) using the recommendation module to determine an average education level of residents in each locality based on the census data relating to the residents; and (ii) using the recommendation module to assign an education score to each locality based on a presence of residents in the locality with similar education level to the user. In this case, the housing recommendation is based on the base, income, age and/or education score of each locality. For example, if the education level of the user is "tertiary" and the average education level of the residents in locality ABC is "secondary" while the average education level of the residents in locality XYZ is also "tertiary", it can be said that the average education level of the residents in locality XYZ has a greater similarity to the user than the average education level of residents in locality ABC. In other words, it can be said that there is a greater presence of residents in locality XYZ with similar education level to the user compared to locality ABC. Locality XYZ can be assigned a higher education score compared to locality ABC, a higher score indicating a greater presence of residents with similar education level to the user.

The security level (e.g. crime rate, number of fraud cases) is also an important component to consider when providing a housing recommendation. Accordingly, in an implementation, the method for providing the housing recommendation to the user may further include the steps of: (i) using the recommendation module to determine a security level of each locality based on crime data of the geographical area and electronic payment transaction fraud data relating to electronic payment transactions involving merchants located within the geographical area; and (ii) using the recommendation module to assign a security score to each locality based on the security level. In such a case, the housing recommendation is based on the base and security score of each locality. The security level may be a quantitative measurement (e.g. the crime data of the each locality in the geographical area comprises the number of burglary cases in a month) or a qualitative measurement (e.g. the crime data of the each locality in the geographical area is derived from surveys involving residents in each locality). The electronic payment transaction fraud data may be captured and aggregated by the payment facilitator and stored in a database that is communicatively coupled with the recommendation module.

The infrastructure quality level (e.g. quality/presence of amenities such as community centres, playgrounds, parks, places of worship, supermarkets, post offices, police stations, libraries and other similar public facilities) is also an important component to consider when providing a housing recommendation. Accordingly, in an implementation, the method for providing the housing recommendation to the user may further include the steps of: (i) using the recommendation module to determine an infrastructure quality level of each locality based on infrastructure data of the geographical area, the infrastructure data indicative of a quality and/or presence of amenities in the locality; and (iii) using the recommendation module to assign an infrastructure score to each locality based on the infrastructure quality level of the locality. In this case, the housing recommendation is based on the base and infrastructure score of each locality.

The infrastructure quality level may be a quantitative measurement (e.g. the infrastructure data may comprise the total number of post offices, police stations, libraries and parks in each locality) or a qualitative measurement (e.g. the infrastructure data is derived from surveys involving residents in each locality regarding their opinion on the quality (maintenance, newness, etc.) of the amenities in their locality). The infrastructure data may be captured/aggregated and stored in the GIS, which is communicatively coupled with the recommendation module.

The transport quality level (e.g. reliability, frequency, safety and accessibility of public transport such as buses, trains, taxis; presence of transportation hubs such as airports, harbours, train stations, etc.; presence of roads and expressways) is yet another important component to consider when providing a housing recommendation. Accordingly, in an implementation, the method for providing the housing recommendation to the user may further include the steps of: (i) using the recommendation module to determine a transport quality level of each locality based on transport data of the geographical area, the transport data indicative of, at least, reliability, frequency, safety and accessibility of public transport in the locality; and (ii) using the recommendation module to assign a transport score to each locality based on the transport quality level of the locality. In this case, the housing recommendation is based on the base and transport score of each locality. The transport data may be compiled/aggregated and stored in the GIS.

As mentioned above, each score may be associated with a housing recommendation component. For example, the base score is related to similarity in spending behavior between residents in a locality and the user; the merchant score is related to a presence of merchants of an industry-type for which there is historical expenditure by the user; the income score is related to a presence of residents in a locality with similar income to the user; the age score is related to a presence of residents in a locality with similar age to the user; the education score is related to a presence of residents in a locality with similar education level to the user; the security score is related to the security/safety of a locality; the infrastructure score is related to the infrastructure/amenity quality level of a locality; and the transport score is related to the accessibility/public transport quality level of a locality. An embodiment may only take into account the base component (i.e. spending behavior between residents in a locality and the user). Another embodiment may take into account more than one component (i.e. the base component and an additional component). Yet another embodiment may take into account all the components mentioned above. Taking into account more than one component advantageously provides a more holistic housing recommendation. A housing recommendation that takes into account more than one component is based on a sum of all the scores for the relevant components for each locality. For example, an embodiment that takes into account spending behavior between residents in a locality and the user and accessibility/public transport quality level of a locality is based on a sum of the base and transport scores.

If more than one component is taken into account to provide a housing recommendation, each component may have equal priority/importance (i.e. equal weightage). Alternatively, each component may have different levels of priority/importance such that each component is assigned a different weightage when determining the housing recommendation.

Accordingly, in an implementation, the method for providing the housing recommendation to the user may further include the steps of: (i) receiving weightage data indicative of a priority of each housing recommendation component; (ii) applying the weightage data to each score to generate a weighted score for each housing recommendation component in each locality; (iii) calculating a sum of all the weighted scores for each locality; and (iv) ranking the plurality of localities based on the sum of all the weighted scores for each locality. In this case, the housing recommendation is based on the ranking, and a higher rank indicates a better recommendation in view of the priority/importance of each component. A number of localities (e.g. the top five ranked localities) can be recommended to the user.

In an exemplary embodiment, the scores of some of the various components may be weighted as follows:—

$$Age = W_A(A_U - A_L) \quad (1)$$

$$Income = W_I(I_U - I_L) \quad (2)$$

$$Education = W_E(E_L) \quad (3)$$

$$Crime = W_C(C_L) \quad (4)$$

$$Infrastructure/Facilities = W_F(F_L) \quad (5)$$

$$Transport = W_T(T_L) = W_{Freq}(Freq_L) + W_{Rel}(Rel_L) + W_{Saf}(Saf_L) + W_{Acc}(Acc_L) \quad (6)$$

In equations (1) to (6), W refers to the weights of the individual components (age, income, education, facilities, transport). The weights can be based on a user's preferences (e.g. received via the user input module) or a statistical method (e.g. regression over a large population). The weights may be a number (e.g. a real number). For example, $W_A$ may be 0.5 and $W_I$ may be 1.0, implying that income has a greater importance than age (i.e. a heavier weightage) in terms of the housing recommendation. As a result, the contribution of the age score to the sum of all the scores is half of the income score. The U in subscript in equations (1) and (2) refers to the user's age/income or age/income score, and the L in subscript refers to a locality's average age/income or unweighted age/income score. In equations (3) to (6), the L in subscript refers to a locality's unweighted education, crime, infrastructure/facilities or transport score.

In equation (6), the transport component may further comprise sub-components such as the frequency (Freq), reliability (Rel), safety (Saf) and accessibility (Acc) of public transport in a locality. The transport sub-components may be weighted equally or differently. For example, if frequency of public transport is of greater importance, $W_{Freq}$ may be assigned a higher number (i.e. higher weightage).

Embodiments advantageously provide a personalized housing recommendation to a user based on his/her spending behavior and other characteristics/preferences. Furthermore, the ability to prioritize various components of the housing recommendation allows the user to receive a recommendation that is tailored to his/her priorities. This is because two different users may have similar spending behaviour but different priorities (one may feel that having neighbours of similar age is important while another may feel that a safe location is more important).

Figure 2:
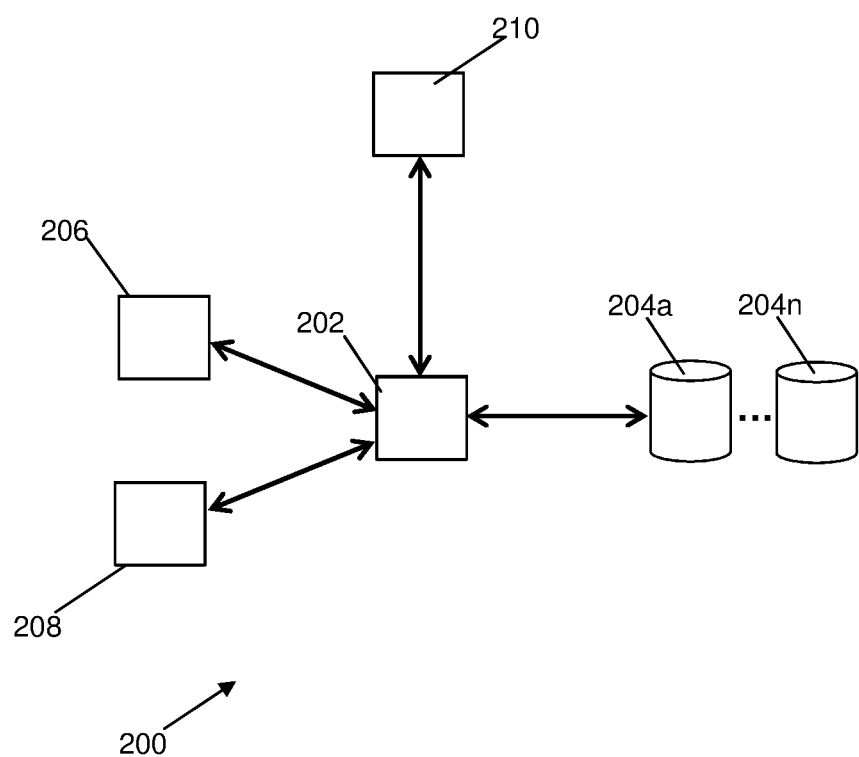
FIG. 2 shows a schematic of a system for providing a housing recommendation according to an embodiment.

FIG. 2 shows a schematic of a network-based system 200 for providing a housing recommendation to a user, according to an embodiment of the invention. The system 200 comprises a purpose-built computing device in the form of a recommendation module 202, one or more databases 204a ... 204n, a user input module 206, a user output module 208, and a geographic information system (GIS) 210. Each of the one or more databases 204a ... 204n and the GIS 210 are communicatively coupled with the recommendation module 202. The user input module 206 and a user output module 208 may be separate and distinct modules communicatively coupled with the recommendation module 202. Alternatively, the user input module 206 and a user output module 208 may be integrated within a single mobile electronic device (e.g. a mobile phone, a tablet computer, etc.). The mobile electronic device may have appropriate communication modules for wired/wireless communication with the recommendation module 202 via existing communication protocols.

The recommendation module 202 may comprise at least one processor and at least one memory including computer program code. The at least one memory and the computer program code is configured to, with at least one processor, cause the recommendation module 202 at least to: (A) determine a spending behavior of the user based on transaction data relating to electronic payment transactions involving the user; (B) divide a geographical area into a plurality of localities based on geographic information from the GIS 210; (C) determine an average spending behavior of residents in each locality based on transaction data relating to electronic payment transactions involving the residents; (D) assign a base score to each locality based on a presence of residents in the locality with similar spending behavior to the user; and (E) transmit the housing recommendation that is based on the base score of each locality to the user output module 208.

The spending behavior of the user may comprise historical expenditure in each of a plurality of industry-types, and the recommendation module 202 may be further caused to: identify merchants of each industry-type in each locality based on merchant data relating to merchants within the geographical area; and assign a merchant score to each locality based on a presence of merchants of each industry-type for which there is historical expenditure. The housing recommendation is based on the base and merchant score of each locality.

In an implementation, the recommendation module 202 may be further caused to: receive user demographic data indicative of an income of the user from the user input module 206; determine an average income of residents in each locality based on census data relating to the residents; and assign an income score to each locality based on a presence of residents in the locality with similar income to the user. The housing recommendation is based on the base and income score of each locality.

The user demographic data may be further indicative of an age of the user, and the recommendation module 202 may be further caused to: determine an average age of residents in each locality based on the census data relating to the residents; and assign an age score to each locality based on a presence of residents in the locality with similar age to the user. The housing recommendation is based on the base, income and age score of each locality.

The user demographic data may be further indicative of an education level of the user, and the recommendation module 202 may be further caused to: determine an average education level of residents in each locality based on the census data relating to the residents; and assign an education score to each locality based on a presence of residents in the locality with similar education level to the user. The housing recommendation is based on the base, income, age and education score of each locality.

The recommendation module 202 may be further caused to: determine a security level of each locality based on crime data of the geographical area and electronic payment transaction fraud data relating to electronic payment transactions involving merchants located within the geographical area; and assign a security score to each locality based on the security level. The housing recommendation is based on the base and security score of each locality.

In addition or alternatively, the recommendation module 202 may be further caused to: determine an infrastructure quality level of each locality based on infrastructure data of the geographical area, the infrastructure data indicative of a quality of amenities in the locality; and assign an infrastructure score to each locality based on the infrastructure quality level. The housing recommendation is based on the base and infrastructure score of each locality.

The recommendation module 202 may be further caused to: determine a transport quality level of each locality based on transport data of the geographical area, the transport data indicative of reliability, frequency, safety and accessibility of public transport in the locality; and assign a transport score to each locality based on the transport quality level. The housing recommendation is based on the base and transport score of each locality.

Each score may be associated with a housing recommendation component, and the recommendation module 202 may be further caused to: receive weightage data indicative of a priority of each housing recommendation component; apply the weightage data to each score to generate a weighted score for each housing recommendation component in each locality; calculate a sum of all the weighted scores for each locality; and rank the plurality of localities based on the sum of all the weighted scores for each locality, wherein the housing recommendation is based on the ranking The various types of data, e.g. the electronic payment transaction data, the merchant data, the census data, etc., can be stored in a single database (e.g. 204*a*), or stored in multiple databases. The databases 204*a* . . . 204*n* may be realized using cloud computing storage modules and/or dedicated servers communicatively coupled with the recommendation module 202.

Figure 3:
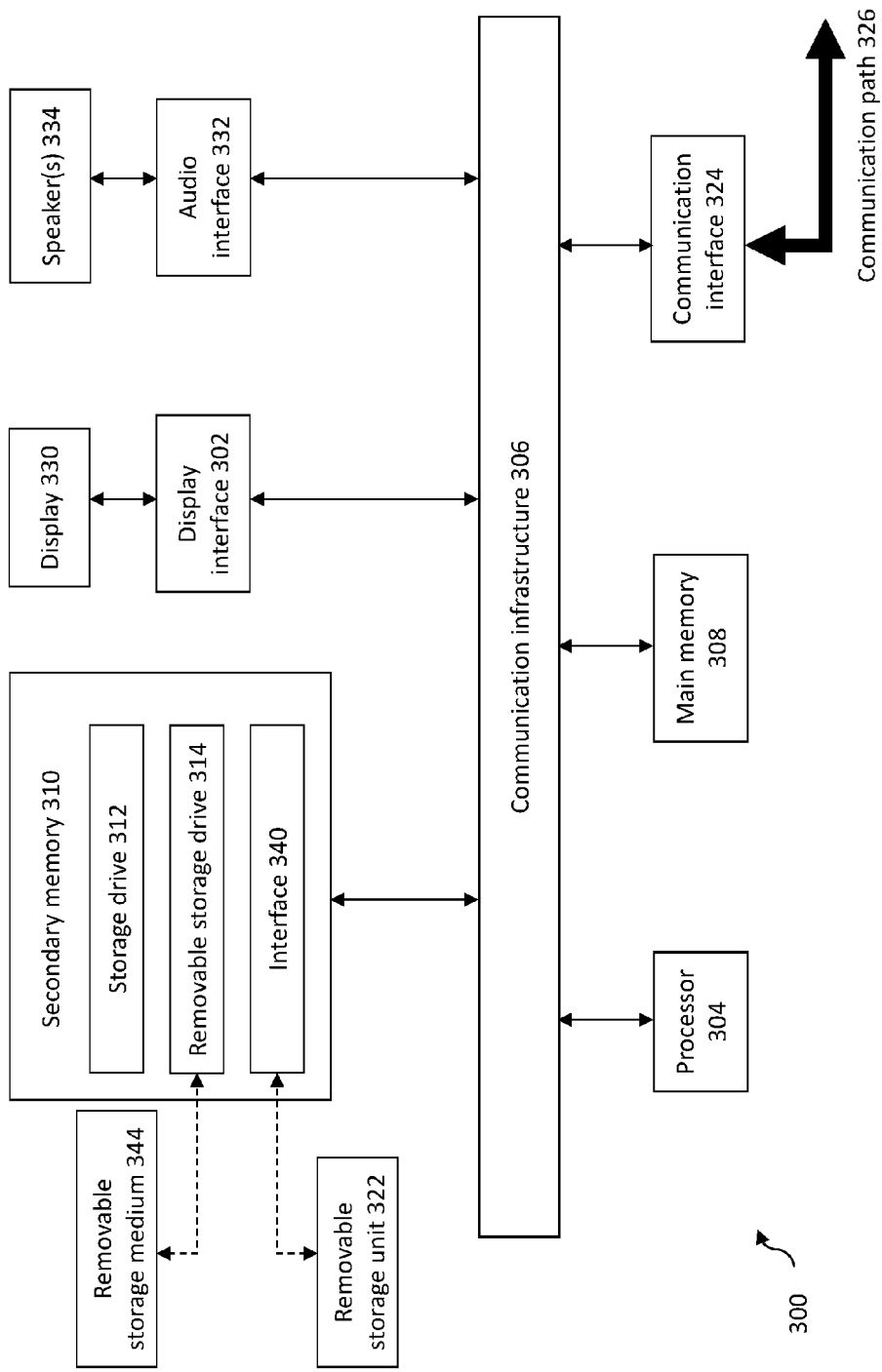
FIG. 3 shows an exemplary computing device suitable for executing the method for providing a housing recommendation.

FIG. 3 depicts an exemplary computer/computing device 300, hereinafter interchangeably referred to as a computer system 300, where one or more such computing devices 300 may be used to facilitate execution of the above-described method for providing a housing recommendation. In addition, one or more components of the computer system 300 may be used to realize the recommendation module 202 and/or GIS 210. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 300. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 344 in a well-known manner. The removable storage medium 344 may include magnetic tape, optical disk, non-volatile memory storage medium, or the like, which is read by and written to by removable storage drive 314. As will be appreciated by persons skilled in the relevant art(s), the removable storage medium 344 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 340. Examples of a removable storage unit 322 and interface 340 include a program cartridge and cartridge interface (such as that found in video game console devices), a removable memory chip (such as an EPROM or PROM)

and associated socket, a removable solid state storage drive (such as a USB flash drive, a flash memory device, a solid state drive or a memory card), and other removable storage units 322 and interfaces 340 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port (such as a serial, parallel, printer, GPIB, IEEE 1394, RJ45, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to removable storage medium 344, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 300 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 300 using the removable storage drive 314, the storage drive 312, or the interface 340. Alternatively, the computer program product may be downloaded to the computer system 300 over the communications path 326. The software, when executed by the processor 304, causes the computing device 300 to perform functions of embodiments described herein.

In an embodiment, there is provided a non-transitory computer readable medium having stored thereon executable instructions for controlling a recommendation module to perform steps comprising: determining a spending behavior of the user based on transaction data relating to electronic payment transactions involving the user; dividing a geographical area into a plurality of localities based on geographic information from a geographic information system (GIS) that is communicatively coupled with the recommendation module; determining an average spending behavior of residents in each locality based on transaction data relating to electronic payment transactions involving the residents; assigning a base score to each locality based on a presence of residents in the locality with similar spending behavior to the user; and transmitting the housing recommendation that is based on the base score of each locality to a user output module communicatively coupled with the recommendation module.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for providing a housing recommendation to a user, comprising:
   capturing, by a recommendation module of a computer system, from a data warehouse, transaction data on a plurality of transactions;
   using transaction data relating to electronic payment transactions involving the user, from the transaction data captured from the data warehouse, determining, by a processor of a recommendation module, of a computer system, a spending behaviour of the user, wherein said recommendation module is communicatively coupled to the data warehouse, a geographic information system (GIS), to at least one database device, and to a user output module;
   communicating, by the recommendation module, with the GIS, and receiving therefrom geographic information on a geographical area;
   dividing, by the processor of the recommendation module, the geographical area into a plurality of localities based on the geographic information received from the GIS;
   determining, using by the processor of the recommendation module, an average spending behaviour of residents in each locality of the plurality of localities based on transaction data relating to electronic payment transactions involving the residents;

based on a presence of residents, in a respective locality, with similar spending behaviours to the user, generating, using the recommendation module, a base score for each respective locality of the plurality of localities; and transmitting, by the recommendation module, to the user output module, the housing recommendation that is based on the generated base score of each locality.

2. The method as claimed in claim 1, wherein the spending behaviour of the user comprises historical expenditure in each of a plurality of industry-types, and the method further comprises:

identifying, using the recommendation module, merchants of each industry-type in each locality based on merchant data relating to merchants within the geographical area; and assigning, using the recommendation module, a merchant score to each locality based on a presence of merchants of each industry-type for which there is historical expenditure, wherein the housing recommendation is based on the base and merchant score of each locality.

3. The method as claimed in claim 2, wherein identifying merchants of each industry-type in each locality comprises:

retrieving a physical location and merchant category code (MCC) of each merchant based on the merchant data; and determining, for each locality, a quantity of merchants of each industry-type based on the retrieved physical location and MCC of each merchant.

4. The method as claimed in claim 2, wherein the historical expenditure comprises an average ticket size and/or a frequency of the electronic payment transactions involving the user.

5. The method as claimed in claim 2, wherein each score is associated with a housing recommendation component, and wherein the method further comprises:

receiving weightage data indicative of a priority of each housing recommendation component;

applying the weightage data to each score to generate a weighted score for each housing recommendation component in each locality;

calculating a sum of all the weighted scores for each locality; and ranking the plurality of localities based on the sum of all the weighted scores for each locality, wherein the housing recommendation is based on the ranking.

6. The method as claimed in claim 1, further comprising:

receiving, from a user input module communicatively coupled with the recommendation module, user demographic data indicative of an income of the user;

determining, using the recommendation module, an average income of residents in each locality based on census data relating to the residents; and assigning, using the recommendation module, an income score to each locality based on a presence of residents in the locality with similar income to the user, wherein the housing recommendation is based on the base and income score of each locality.

7. The method as claimed in claim 6, wherein the user demographic data is further indicative of an age of the user, and the method further comprises:

determining, using the recommendation module, an average age of residents in each locality based on the census data relating to the residents; and assigning, using the recommendation module, an age score to each locality based on a presence of residents in the locality with similar age to the user, wherein the housing recommendation is based on the base, income and age score of each locality.

8. The method as claimed in claim 7, wherein the user demographic data is further indicative of an education level of the user, and the method further comprises:

determining, using the recommendation module, an average education level of residents in each locality based on the census data relating to the residents; and assigning, using the recommendation module, an education score to each locality based on a presence of residents in the locality with similar education level to the user, wherein the housing recommendation is based on the base, income, age and education score of each locality.

9. The method as claimed in claim 1, further comprising:

determining, using the recommendation module, a security level of each locality based on crime data of the geographical area and electronic payment transaction fraud data relating to electronic payment transactions involving merchants located within the geographical area; and assigning, using the recommendation module, a security score to each locality based on the security level, wherein the housing recommendation is based on the base and security score of each locality.

10. The method as claimed in claim 1, further comprising:

determining, using the recommendation module, an infrastructure quality level of each locality based on infrastructure data of the geographical area, the infrastructure data indicative of a quality of amenities in the locality; and assigning, using the recommendation module, an infrastructure score to each locality based on the infrastructure quality level, wherein the housing recommendation is based on the base and infrastructure score of each locality.

11. The method as claimed in claim 1, further comprising:

determining, using the recommendation module, a transport quality level of each locality based on transport data of the geographical area, the transport data indicative of reliability, frequency, safety and accessibility of public transport in the locality; and assigning, using the recommendation module, a transport score to each locality based on the transport quality level, wherein the housing recommendation is based on the base and transport score of each locality.

12. A system for providing a housing recommendation to a user, comprising a recommendation module comprising:

at least one processor; and at least one memory including computer program code;

the at least one memory and the computer program code configured to, with at least one processor, cause the recommendation module at least to:

capture, from a data warehouse, transaction data on a plurality of transactions;

using transaction data relating to electronic payment transactions involving the user, from the transaction data captured from the data warehouse, determine a spending behaviour of the user, wherein said recommendation module is communicatively coupled to the data warehouse, a geographic information system (GIS), to at least one database device, and to a user output module;

communicate with the GIS, and receive therefrom geographic information on a geographical area;

divide the geographical area into a plurality of localities based on geographic information received from the GIS;

determine an average spending behaviour of residents in each locality of the plurality of localities based on transaction data relating to electronic payment transactions involving the residents;

based on a presence of residents, in a respective locality, with similar spending behaviours to the user, generate a base score for each respective locality of the plurality of localities; and transmit, to the user output module, the housing recommendation that is based on the generated base score of each locality.

13. The system as claimed in claim 12, wherein the spending behaviour of the user comprises historical expenditure in each of a plurality of industry-types, and the recommendation module is further caused to:

identify merchants of each industry-type in each locality based on merchant data relating to merchants within the geographical area; and assign a merchant score to each locality based on a presence of merchants of each industry-type for which there is historical expenditure, wherein the housing recommendation is based on the base and merchant score of each locality.

14. The system as claimed in claim 13, wherein each score is associated with a housing recommendation component, and wherein the recommendation module is further caused to:

receive weightage data indicative of a priority of each housing recommendation component;

apply the weightage data to each score to generate a weighted score for each housing recommendation component in each locality;

calculate a sum of all the weighted scores for each locality; and rank the plurality of localities based on the sum of all the weighted scores for each locality, wherein the housing recommendation is based on the ranking.

15. The system as claimed in claim 12, wherein the recommendation module is further caused to:

receive user demographic data indicative of an income of the user from a user input module communicatively coupled with the recommendation module;

determine an average income of residents in each locality based on census data relating to the residents; and assign an income score to each locality based on a presence of residents in the locality with similar income to the user, wherein the housing recommendation is based on the base and income score of each locality.

16. The system as claimed in claim 15, wherein the user demographic data is further indicative of an age of the user, and the recommendation module is further caused to:

determine an average age of residents in each locality based on the census data relating to the residents; and assign an age score to each locality based on a presence of residents in the locality with similar age to the user, wherein the housing recommendation is based on the base, income and age score of each locality.

17. The system as claimed in claim 16, wherein the user demographic data is further indicative of an education level of the user, and the recommendation module is further caused to:

determine an average education level of residents in each locality based on the census data relating to the residents; and assign an education score to each locality based on a presence of residents in the locality with similar education level to the user, wherein the housing recommendation is based on the base, income, age and education score of each locality.

18. The system as claimed in claim 12, wherein the recommendation module is further caused to:

determine a security level of each locality based on crime data of the geographical area and electronic payment transaction fraud data relating to electronic payment transactions involving merchants located within the geographical area; and assign a security score to each locality based on the security level, wherein the housing recommendation is based on the base and security score of each locality.

19. The system as claimed in claim 12, wherein the recommendation module is further caused to:

determine an infrastructure quality level of each locality based on infrastructure data of the geographical area, the infrastructure data indicative of a quality of amenities in the locality; and assign an infrastructure score to each locality based on the infrastructure quality level, wherein the housing recommendation is based on the base and infrastructure score of each locality.

20. The system as claimed in claim 12, wherein the recommendation module is further caused to:

determine a transport quality level of each locality based on transport data of the geographical area, the transport data indicative of reliability, frequency, safety and accessibility of public transport in the locality; and assign a transport score to each locality based on the transport quality level, wherein the housing recommendation is based on the base and transport score of each locality.

21. A non-transitory computer readable medium having stored thereon executable instructions for controlling a recommendation module to perform steps comprising:

capturing, from a data warehouse, transaction data on a plurality of transactions;

using transaction data relating to electronic payment transactions involving the user, from the transaction data captured from the data warehouse, determining a spending behaviour of the user, wherein said recommendation module is communicatively coupled to the data warehouse, a geographic information system (GIS), to at least one database device, and to a user output module;

communicating, by the recommendation module, with the GIS, and receiving therefrom geographic information on a geographical area;

dividing the geographical area into a plurality of localities based on the geographic information from the GIS;

determining an average spending behaviour of residents in each locality of the plurality of localities based on transaction data relating to electronic payment transactions involving the residents;

based on a presence of residents, in a respective locality, with similar spending behaviours to the user, generating a base score for each respectively locality of the plurality of localities; and transmitting, to the user output module, the housing recommendation that is based on the generated base score of each locality.

* * * * *